United States Patent [19]

Capoccia et al.

[11] Patent Number: 4,742,845

[45] Date of Patent: May 10, 1988

[54] FUEL PRESSURE REGULATOR VALVE

[75] Inventors: David Capoccia, Warren; Alexander Chadwick, South Lyon, both of Mich.

[73] Assignee: Weber U.S.A., Inc., Farmington Hills, Mich.

[21] Appl. No.: 95,598

[22] Filed: Sep. 11, 1987

[51] Int. Cl.$^4$ ............................................. F16K 31/12
[52] U.S. Cl. ..................................... 137/510; 251/85; 251/87; 251/356
[58] Field of Search ................... 137/510; 251/85, 87, 251/356

[56] References Cited

U.S. PATENT DOCUMENTS

| | | | |
|---|---|---|---|
| 2,452,354 | 10/1948 | Buckuell | 251/85 |
| 2,678,187 | 5/1954 | Peters | 137/510 UX |
| 3,472,481 | 10/1969 | Spies | 251/85 |
| 4,237,924 | 12/1980 | Benjamin | 137/510 |

*Primary Examiner*—Harold W. Weakley
*Attorney, Agent, or Firm*—Rhodes and Boller

[57] ABSTRACT

The valve of a liquid fuel pressure regulator comprises a two-part construction consisting of a spherically contoured element and a stem. The spherically contoured element serves to swivelly mount the valve on the movable wall which carries the valve. The spherically contoured element comprises a hole which is on a radial to the center of the element. The shank of the stem is press-fitted to this hole to dispose the stem's flat circular head toward a seat with which the valve coacts as the pressure regulator operates. The swivel mounting compensates for misalignment and out-of-squareness of the valve travel relative to the seat and enables the head to close flat against the seat. Two embodiments are disclosed. In one, the spherically contoured element is a sphere and the hole is a blind hole drilled into the sphere. In the other, the spherically contoured element is a truncated sphere and the hole is a through-hole. Preferably the mounting includes a small spring for spring loading the valve within its mounting. In the one embodiment this spring bears against the sphere, and in the other, it bears against the distal end of the stem's shank.

19 Claims, 3 Drawing Sheets

ZONE OF SWIVELLING

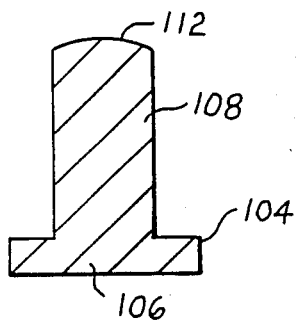
FIG. 6
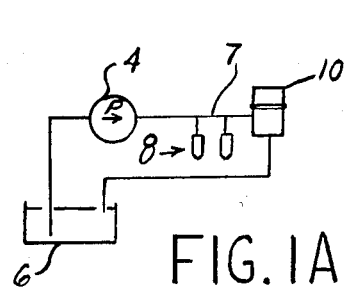
FIG. 1A
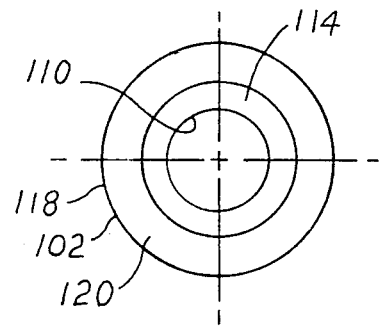
FIG. 8
FIG. 7
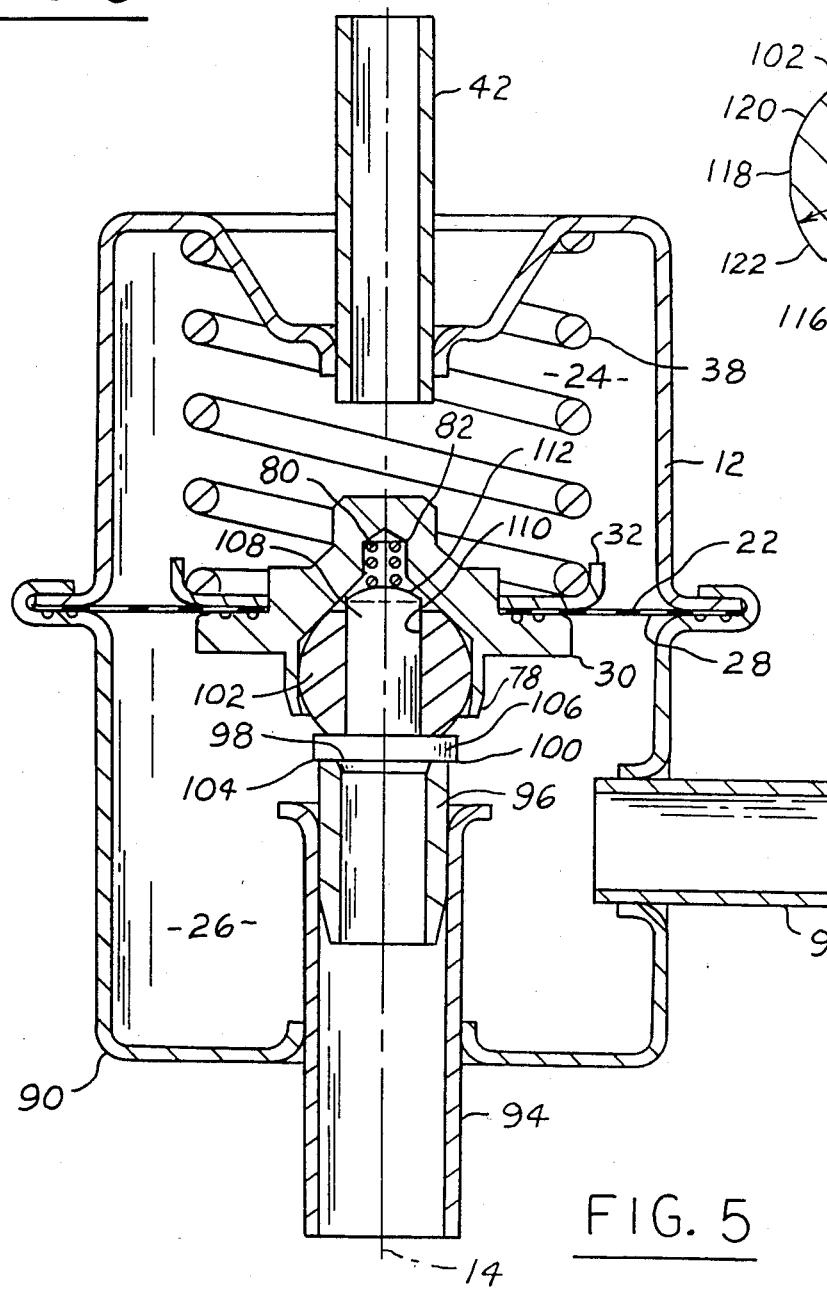
FIG. 5

FUEL PRESSURE REGULATOR VALVE

BACKGROUND AND SUMMARY OF THE INVENTION

This invention relates generally to fuel pressure regulators of the type which are used in liquid fuel management systems such as fuel injection systems for internal combustion engines. More specifically the invention relates to an improvement in the valve portion of the pressure regulator.

In a typical fuel injection system, liquid fuel is pumped from the fuel tank to the injector(s) via a fuel rail that serves the injectors. It is an accepted practice to use a fuel pressure regulator in association with the fuel rail to set a pressure limit at which fuel is delivered to the injector(s). The pressure regulator also serves to dampen pressure surges and to keep the rail pressurized when the system is shut off.

While various embodiments of fuel pressure regulators are disclosed in prior patents, they generally share a number of similarities. A liquid fuel chamber portion of the pressure regulator is in communication with the fuel rail to pressure-regulate the fuel pumped into the rail from the tank. The liquid fuel chamber is separated from a control chamber portion by a movable wall that carries a valve disposed within the chamber. The control chamber comprises a control means for controlling response of the movable wall to pressure conditions in the liquid fuel chamber. The valve controls an orifice through which excess fuel is returned to tank. The movable wall is positioned in accordance with the forces acting on its opposite sides, thereby setting the effective size of the orifice. In this way, excess pressure is relieved, resulting in fairly well regulated pressure being established for the liquid fuel in the rail.

In most pressure regulators the orifice comprises a seat for the valve, and the valve closes and opens the orifice by seating on and unseating from the orifice seat. The control means typically comprises a helical coil spring disposed within the control chamber and acting on the movable wall to urge the valve toward closure of the orifice. The control means can also comprise a port for communication of the control chamber to a fluid pressure reference such as manifold, vacuum for example. The movable wall which carries the valve is typically an annular diaphragm whose outer periphery is held between mating edges of the two halves of the pressure regulator housing. The inner periphery of the diaphragm is held between a member which is toward the control chamber side to form a seat for the control spring and a mounting which is toward the liquid fuel chamber side for mounting of the valve on the movable wall.

Various types of valves are illustrated in prior fuel pressure regulator patents. The importance of securing proper alignment between the valve and the seat is evident, and these patents suggest various means for obtaining this result. The use of spheres is shown in U.S. Pat. Nos. 3,106,219; 3,511,270; and 4,627,463. The use of circular discs is also shown in a number of patents. In many of these disc designs, the disc is physically attached to a sphere which can swivel in its mounting on the diaphragm. For examples of such disc-sphere combinations, attention is directed to U.S. Pat. Nos. 4,327,767; 4,431,026; 4,505,296; and 4,653,528. One U.S. Pat. No. 4,559,968, even shows a sphere attached to a sphere. The use of a truncated sphere is also known, as evidenced by U.S. Pat. No. 4,237,924.

On the basis of the extensive use of spheres in prior patents on this subject, it should be apparent that the swivelling capability which is obtained through the use of a sphere is very advantageous in taking out misalignment which otherwise may exist in a liquid fuel pressure regulator between the valve and seat. Likewise the use of flat discs suggests their importance in securing full closure of a valve with a flat seat.

Despite the existence of these attributes in various prior fuel pressure regulators, the processes by which their valves are manufactured tend to complicate the fabrication process. A sphere per se is not difficult to manufacture; however, when a circular disc must be attached to it, the prior processes have resorted to the use of welding, soldering or the like to join the two parts together. Since the parts are physically small, such joining procedures are rather intricate. Furthermore, they add to the production cost because they require suitable equipment to perform the joining, and this joining constitutes an additional operation in the overall fabrication process. While the truncated sphere embodiment of U.S. Pat. No. 4,237,924 would appear to combine the benefits of the sphere-disc combinations without the necessity of the joining operation, the step of taking a hardened sphere and truncating it is not a simple task either. It may still be necessary to conduct further processing of both disc-sphere combinations and truncated spheres in order to render them suitable for use as fuel pressure regulator valves.

The nature of the particular material used in such valves is also an important consideration for several reasons. Liquid fuels, such as gasoline, are highly corrosive, and the materials employed must withstand this severe environment. In the disc-sphere combination, the material of the disc and that of the sphere must be compatible with the particular joining medium which is employed. In the case of the truncated sphere, the truncation may require treatment of its surface and finish.

The present invention relates to improvements in fuel pressure regulator valves which embody the attributes of swivelling and a flat surface for coaction with a seat, but free of certain of the constraints of the prior designs described above. One important advantage of the invention is that the portion of the valve which seats on the seat can be of a material diverse from that of the portion of the valve which provides the swivelling capability. The invention discloses the valve construction as two separate parts assembled together without the use of joining procedures such as welding or soldering. Elimination of joining procedures is another advantage.

One part of the valve is spherically contoured and captured in a mounting on the movable wall (diaphragm) for swivelling. This one part contains a hole which lies on a radial and which in general is toward the seat over the part's swivel mounting on the movable wall. This swivel mounting results in the axis of the hole being positionable within a conical zone of swivelling conspherical with the spherical contour of the part.

The second part of the valve is a stem which comprises a circular head and a shank which extends from the head. The stem is operatively related to the spherically contoured part by fitting the stem's shank into the hole in the spherically contoured part. Preferably the shank is press-fitted to the hole until the head abuts the spherically contoured part around the hole's opening.

The head is preferably in the shape of a flat circular disc.

Consequently, the resultant two-part valve is endowed both with swivelling capability within its mounting on the diaphragm by virtue of the spherically contoured part, and with a flat closure surface for seating against the seat by virtue of the shape of the stem's head.

The preferred mounting comprises a receptacle space within which the spherically contoured part is captured. While the receptacle space is designed to preclude appreciable bodily displacement of the spherically contoured part within the receptacle space, limited bodily displacement along the line of action toward and away from the seat. combined with swivelling, is present in the mounting. A small compression spring within the mounting exerts a force on the valve in a direction toward the seat. When the valve is seated, it is slightly retracted into the receptacle space. When the valve is unseated, the small spring urges the spherically contoured part against an annular bearing surface of the mounting which captures the spherically contoured part in the receptacle space. The force exerted by the small spring, as reacted against this annular surface, serves to hold the unseated valve in the particular swivel orientation which it assumed when last seated. The unseating of the valve is very uniform around the circumference of the orifice, a distinct advantage. The orientation is maintained for subsequent uniform closing, but in any event, the valve is self-aligning with the orifice upon closing, thereby essentially eliminating the movable wall (diaphragm) as a source of imperfection in securing full closing. In other words, whenever the valve closes, it always finally attains the same full closure, despite diaphragm tipping or distortion.

Two particular embodiments of the invention are disclosed herein. In one embodiment the spherically contoured part is a sphere, and the hole is a blind one which is drilled partially into the sphere. The small spring engages the spherical surface of the sphere in the hemisphere opposite the hemisphere where the head of the stem is disposed.

In the second embodiment, the spherically contoured part is a truncated sphere having parallel truncations in opposite hemispheres. The hole is a through-hole extending from the center of one truncation, through the center of the sphere, and to the center of the opposite truncation. The shank of the stem extends completely through and beyond the through-hole. The distal end surface of the shank is spherically contoured to the same spherical contour as that of the truncated sphere, and it is disposed at the same radius from the center of the truncated sphere as is the truncated sphere's own spherical surface. The small spring within the mounting bears against the distal end of the shank. The zone of swivelling is limited by abutment of the head of the stem with an annular lip of the mounting which contains the annular bearing surface which captures the truncated sphere within the mounting. The parts are proportioned such that the small spring is precluded from riding off the distal end of the shank within the defined conical zone of swivelling. The truncated sphere is advantageously fabricated by powdered metal fabrication techniques while the stem is a machined metal part.

The foregoing features, advantages, and benefits of the invention will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1A is a schematic drawing of a representative fuel injection system.

FIG. 5 is a longitudinal cross sectional view through a second embodiment of fuel pressure regulator according to the invention.

FIG. 6 is an enlarged longitudinal cross sectional view of one of the elements of FIG. 5 by itself.

FIG. 7 is an enlarged longitudinal cross sectional view of another of the elements of FIG. 5 by itself.

FIG. 8 is a full end view of the element of FIG. 7.

DESCRIPTION OF THE PREFERRED EMBODIMENT

Figure 1:
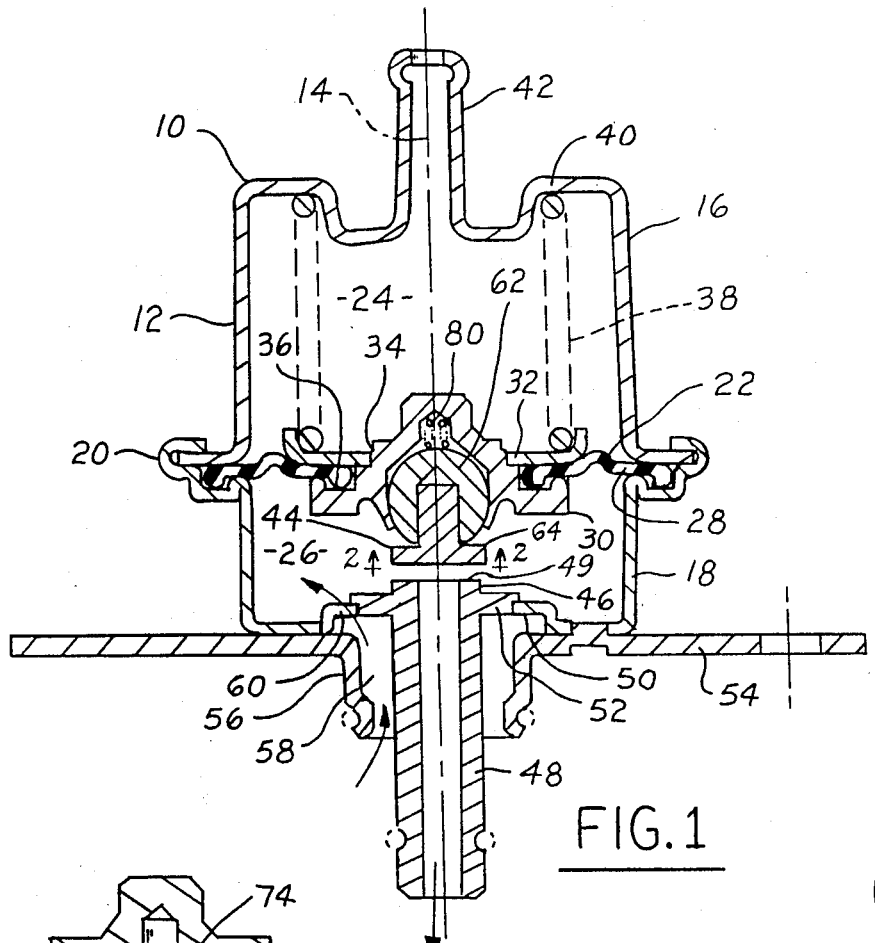
FIG. 1 is a longitudinal cross sectional view through a first embodiment of fuel pressure regulator according to the invention.

FIG. 1A shows a representative use of a fuel pressure regulator 10 of the invention where the liquid fuel management system comprises a pump 4 which pumps fuel from a tank 6 to a rail 7 which serves fuel injectors 8. The pressure regulator is in association with the rail to regulate the fuel pressure in the rail.

FIG. 1 illustrates a first embodiment of fuel pressure regulator 10 according to principles of the present invention.

Fuel pressure regulator 10 comprises a generally cylindrical shaped housing 12 having a main longitudinal axis 14. Housing 12 comprises two walled parts 16, 18 which are joined to each other at a circular joint 20 around the sidewall of housing 12. Joint 20 also serves to capture the outer periphery of a transverse movable wall 22 within housing 12 which divides the housing into a control chamber portion 24 and a liquid fuel chamber portion 26.

Movable wall 22 comprises in assembly, a circular annular diaphragm 28, a circular cylindrical valve housing 30, and a circular annular spring seat 32. A central portion of valve housing 30 protrudes through diaphragm 28 and spring seat 32. Spring seat 32 fits and is secured onto a shoulder of valve housing 30 at the location designated by the numeral 34. This attachment captures the inner periphery of diaphragm 28 in a joint 36 between the two parts 30, 32. Both inner and outer peripheries of diaphragm 28 contain beads which are held compressed in the respective joints so that both joints are rendered leak-proof.

Spring seat 32 is toward the control chamber side of movable wall 22 and serves to seat one end of a main helical coiled control spring 38 disposed within control chamber 24. The opposite end of spring 38 is disposed in a seat 40 formed integrally in the end wall of housing part 16. Spring 38 exerts a force on movable wall 22 in the direction of liquid fuel chamber 26. As will become apparent from ensuing description, this spring force serves to urge the movable wall in a direction which urges the fuel pressure regulator valve closed.

The end wall of housing part 16 includes a centrally disposed nipple 42 via which the interior space of control chamber 24 may be communicated to a fluid reference (not shown) such as manifold vacuum. Thus, in the embodiment of FIG. 1, control chamber 24 comprises two independent means acting on movable wall 22, namely control spring 38 and the fluid reference; the resultant control imposed on the movable wall from the control chamber will be the combined effect of these two independent means.

Valve housing 30 comprises a mounting for a valve 44. Valve 44 is disposed centrally on movable wall 22 and is positioned along axis 14 toward and away from an orifice 46 with which the valve coacts in performing the pressure regulating function. Orifice 46 is disposed within liquid fuel chamber 26 and is at one end of a tubular element 48 which forms an outlet through which excess fuel is returned from chamber 26 to the fuel tank. The flat annular end surface 49 of orifice 46 forms a seat for valve 44.

The end wall of housing part 18 contains a central circular indentation 50. This indentation contains a circular hole to which a circular flange 52 of tubular element 48 is fitted in a sealed manner.

Fuel pressure regulator 10 is designed to be wall-mounted. FIG. 1 shows the end wall of housing part 18 disposed against and joined in a sealed manner to a wall 54. Wall 54 comprises a hole which is bounded by a circular nipple 56 on the side of the wall opposite the fuel pressure regulator. While nipple 56 is coaxial with tubular element 48, the two are in radially spaced relation to form an annular inlet 58 to chamber 26. One or more small radial slots 60 are formed in the edge of the hole in indentation 50 to communicate the annular inlet 58 to the interior of chamber 26.

During operation of the fuel pressure regulator, the interior of chamber 26 is exposed to liquid fuel in the rail by virtue of inlet 58 and slot(s) 60. Nominally, control chamber 24 urges valve 44 against seat 49 to close orifice 46. Pressure of liquid fuel in the rail, as communicated to chamber 26, tends to urge movable wall 22 toward chamber 24, thereby tending to urge valve 44 away from orifice 46. The combination of the forces acting on movable wall 22 positions valve 44 in relation to orifice 46 such that a pressure-regulating effect is imposed on the liquid fuel in the rail. As stated above, the valve sets a desired pressure limit in the rail, dampens pressure surges, and keeps the rail pressurized when the system is shut off.

Figure 2:
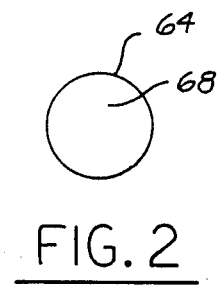
FIG. 2 is a view taken in the direction of arrows 2—2 in FIG. 1 showing one element by itself on an enlarged scale.

According to principles of the invention, valve 44 comprises two separate parts arranged in operative relationship. These two parts are a sphere 62 and a stem 64. Sphere 62 comprises a blind circular hole 66 which is drilled on a radial to the sphere's center to extend slightly beyond the sphere's center. Stem 64 comprises a flat circular head 68 (FIG. 2) and a circular shank 70 which extends coaxially away from head 68. Stem 70 fits into the hole 66 with a press-fit. Hole 66 is sufficiently deep to receive the full length of stem 70 so that an annular region of head 68 surrounding stem 70 abuts the opening of hole 66 at the sphere's surface. It is good practice to slightly break the edge of the hole's opening, such as illustrated by a slight conical counterbore.

Figure 4:
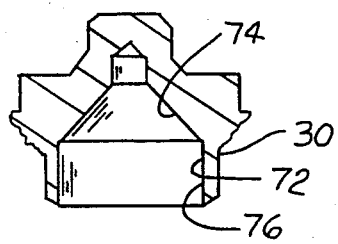
FIG. 4 is a fragmentary longitudinal cross sectional view of another of the elements of FIG. 1 shown by itself on an enlarged scale and before assembly into the pressure regulator.

Valve housing 30 comprises a receptacle space 72 within which sphere 62 is captured. (FIG. 4 shows valve housing 30 by itself before valve 44 is mounted on it.) The receptacle space 72 comprises annular bearing surfaces 74, 76 which are for acting on opposite hemispheres of sphere 62 to axially constrain the sphere within the receptacle space. Bearing surface 76 is for acting on the hemisphere which contains the exposed head 68 when the valve is displaced bodily within the mounting toward orifice 46; the other bearing surface 74 is for acting the other hemisphere when the valve is displaced bodily within the mounting away from orifice 46. The receptacle space has a short axial surface between surfaces 74, 76.

Bearing surface 76 is formed as a consequence of turning slightly inwardly a lip 78, which is integral with valve housing 30, to capture the sphere within the receptacle space after the sphere has been disposed within the receptable space. Sphere 62 serves to endow the valve with a swivelling capability within its mounting; therefore the inward turning of lip 78 to capture sphere 62 will result in the sphere being capable of a limited amount of bodily displacement along axis 14 within the mounting.

It is preferable for the mounting to include a small helical coiled spring 80 which acts on the sphere to urge the sphere into contact with the annular bearing surface 76 when the valve is unseated. Spring 80 is disposed in an integral spring receptacle 82 of valve housing 30 before sphere 62 is disposed within receptacle space 72. Spring receptacle 82 is not only radial to receptacle space 72 and sphere 62, but also coaxial with axis 14. The spring force is therefore applied to the sphere in a direction toward orifice 46.

Figure 3:
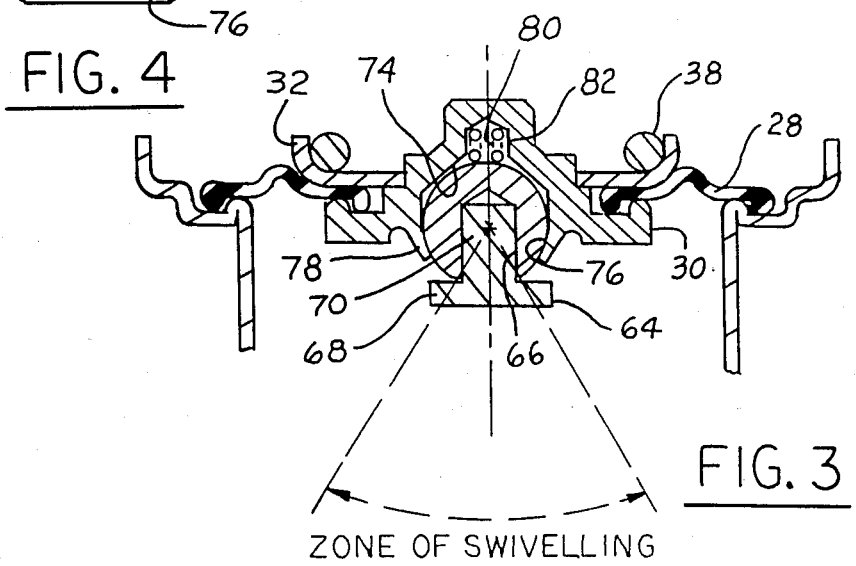
FIG. 3 is an enlarged view of certain portions of FIG. 1 useful in explaining the manner of operation.

With the swivel mounting of valve 44 by sphere 62, the axis of hole 66 can be positioned anywhere within a conical zone of swivelling about the sphere's center. The limit of this zone is defined by abutment of head 68 with the free edge of lip 78. (See FIG. 3) During displacement of the sphere within this conical zone, spring 80 rides on the surface of the sphere.

The inherent nature of the movement of movable wall 22 within housing 12 is such that while substantially axial, the movement does not necessarily result in valve 44 always being square to axis 14. When the pressure regulator operates the valve to closing position, the swivelling capability imparted to the valve by sphere 62 enables the flat end surface of head 68 to seat squarely on seat 49 formed by the flat annular end surface of orifice 46, regardless of whether the movable wall is truly square to axis 14. By making the overall diameter of head 68 appropriately large than the outside diameter of seat 49, full covering of the seat by head 68 can be assured for all degrees of departure of movable wall 22 from squareness. A sufficient diameter for head 68 will also compensate for any axial misalignment in assembly between the assembled parts, and this makes certain tolerances less critical, a desirable attribute for mass production.

When the valve is fully seated, it is slightly retracted into the mounting, with sphere 62 bearing against surface 74 and spring 80 slightly more compressed. As the diaphragm begins to move away from the seat, the small spring maintains the valve closed against the orifice so that the valve is displaced axially within the mounting during this initial movement of the diaphragm away from the seat. Once the diaphragm has moved a sufficient amount that sphere 62 is now abutting bearing surface 76, any further movement of the diaphragm away from the seat will unseat the head 68 from the orifice allowing excess fuel to flow from the liquid fuel chamber through the orifice and back to the tank. The nature of the design is such that the particular position of swivelling within the mounting will be maintained so that when the valve again closes, uniform closing action should also ensue. However, in any event, the valve is self-aligning upon closure to fully seat and close the orifice upon reseating.

One of the important advantages of the invention is that assemly of the two parts of the valve is accomplished merely by pressing the shank of stem 70 into hole 66 in sphere 62 so that no other joining procedures are required. Moreover, sphere 62 is a conventional mass-produced product, and hole 66 is created by the expedient of drilling.

FIGS. 5–8 relate to a second disclosed embodiment of fuel pressure regulator 90 according to principles of the invention. This embodiment shares a number of features with the first embodiment 10, and although these features may differ in certain specific details, the same reference numerals are used for the most part to designate corresponding features in this second embodiment.

Hence, fuel pressure regulator 90 has a housing 12 and a movable wall 22 dividing the housing into a control chamber 24 and a liquid fuel chamber 26. The control chamber comprises a main control spring 38 disposed within the control chamber and a nipple 42 for communicating the interior of the control chamber to a fluid reference. The movable wall 22 comprises a diaphragm 28, a valve housing 30, and a spring seat 32.

Some of the features whose details are more substantially different are assigned unique reference numerals. Hence, the inlet to liquid fuel chamber 26 of embodiment 90 is a circular tube 92 which enters chamber 26 radially of axis 14 through the sidewall of housing 12. The outlet from chamber 26 is a circular tube 94 which passes through the end wall of housing 12 coaxial with axis 14. The end of tube 94 which is disposed within chamber 26 is flared, and a circular tubular orifice element 96 is inserted into this flared end to provide a flat circular annular seat 98 for cooperation with a valve 100 carried by movable wall 22. Valve 100 is generically similar to valve 94, but differs in several respects.

Valve 100 is similar to valve 44 in that it comprises a two-part construction consisting of a spherically contoured element 102 captured within receptacle space 72 of valve housing 30 and a stem 104 having a head 106 and a shank 108 which is press-fitted to a hole 110 in element 102.

Valve 100 differs from valve 44 in that element 102 is a truncated sphere, hole 110 is a through-hole, shank 108 passes completely through hole 110 so that the free end of the shank lies outside hole 110, and the small spring 80 in spring receptacle 82 bears against the distal surface 112 of the exposed free end of the shank. The truncated sphere has parallel truncations 114, 116 symmetrically disposed in opposite hemispheres. The ends of hole 110 are at the centers of the truncations. It is unnecessary for the entire surface of element 102 which lies between the truncations to be of spherical contour; in the disclosed embodiment, this region comprises an axial surface 118 around the equator so that there are two spherically contoured surface bands 120, 122 on opposite hemispheres which constitute the spherical contour.

Moreover, the distal end surface 112 comprises a spherical contour substantially the same as that of element 102 and conspherical with the center of spherical contour of element 102. Still further, the several parts are so proportioned that within the conical zone of swivelling of valve 100 about the center of the truncated sphere 102 whose limit is defined by abutment of head 106 with lip 78, spring 80 is precluded from riding off the distal end surface 112.

As the pressure regulating function is being performed, the valve coacts with seat 98 in opening and closing the orifice in essentially the same manner as in embodiment 10.

One of the advantages of embodiment 90 is that the truncated sphere can be fabricated by powdered metal fabrication techniques while stem 104 is a machined metal part. Powdered metal fabrication is part 102 is an advantageous way to fabricate a part of that shape, yet powdered metal construction can perform satisfactorily in the disclosed environment. The machined stem assures good closing action on seat 98. Accordingly, embodiment 90 may be considered in certain respects to possess attributes not found in embodiment 10 even though both embodiments share useful generic features.

While a preferred embodiment of the invention has been disclosed, it will be appreciated that principles are applicable to other embodiments.

What is claimed is:

1. In a pressure regulator for a liquid fuel management system wherein a liquid fuel chamber portion of the pressure regulator is communicated to a source of liquid fuel for regulating the pressure thereof, said liquid fuel chamber is separated from a control chamber portion of the pressure regulator by a movable wall, said control chamber comprises means for controlling response of said movable wall to pressure conditions in said liquid fuel chamber such that a pressure regulating effect is imposed on the liquid fuel, said liquid fuel chamber comprises an orifice through which excess liquid fuel passes from said liquid fuel chamber, and said movable wall carries an element which coacts with said orifice in performing the pressure regulating function, the improvement which comprises said element comprising a head and a shank, said head being disposed for coaction with said orifice, and said shank serving to operatively relate said element to a separate spherically contoured element contained in a mounting carried by said movable wall, said spherically contoured element containing a hole having an axis which lies on an imaginary line passing through the geometric center of the spherical contour of said spherically contoured element, said mounting comprising means capturing said spherically contoured element on said mounting in a manner which allows said axis of said hole to coincide with any radial within a conical zone about said geometic center thereby providing a conical zone of swivelling for said spherically contoured element about said geometric center within said mounting, said shank operatively relating said first-mentioned element to said spherically contoured element by fitting within said hole, and said head having at least a portion thereof which is disposed exteriorly of said spherically contoured element and which, by virtue of the operative association of said first-mentioned element with said spherically contoured element, is thereby endowed with the capability of being positioned within said conical zone of swivelling as it coacts with said orifice in performance of the pressure regulating function.

2. The improvement set forth in claim 1 in which said orifice comprises a circular annular seat and said head comprises a circular face which has a diameter greater than that of said circular annular seat, said first-mentioned element coacting with said orifice in performing the pressure regulating function by closing and opening said orifice by said face of said head seating on and unseating from said seat.

3. The improvement set forth in claim 2 in which said seat comprises a flat planar surface and said face of said head also comprises a flat planar surface.

4. The improvement set forth in claim 3 in which said hole and said shank are both circular and said shank fits snugly within said hole.

5. The improvement set forth in claim 4 in which said first-mentioned element is related to said spherically contoured element such that an annular region of said head surrounding said shank abuts an annular region of said spherically contoured element surrounding said hole.

6. The improvement set forth in claim 1 in which said movable wall comprises a member on which said spherically countoured element is captured and including resilient means disposed between said member and one of said elements to impart a bias force to said one element within said mounting in a direction toward said orifice.

7. The improvement set forth in claim 1 in which said first-mentioned element is constructed of a material different from that of said spherically contoured element.

8. The improvement set forth in claim 1 in which said spherically contoured element comprises a sphere and said hole is a blind hole extending from the outer surface of the sphere partially into the sphere.

9. The improvement set forth in claim 8 in which said movable wall comprises a member which contains said mounting, said mounting comprising a receptable space in said member for said sphere which allows said sphere a limited amount of bodily movement within said mounting in a direction toward and away from said orifice, said sphere comprising two hemispherical portions, one toward said orifice and the other away from said orifice, said hole being located centrally in said one hemispherical portion, and including resilient means acting between said member and a location on said other hemispherical portion to urge said sphere within said mounting toward said orifice, said means capturing said spherically contoured element on said mounting comprising an annular bearing surface, and said resilient means urging said one hemispherical portion of said sphere against said annular bearing surface.

10. The improvement set forth in claim 9 in which said member contains said annular bearing surface in an integral lip which forms said means capturing said spherically contoured element on said mounting.

11. The improvement set forth in claim 1 in which said hole is a through-hole which exposes at least a portion of the free end of said shank and including resilient means in said mounting acting on the free end of said shank to apply a force against said first-mentioned element in a direction toward said orifice.

12. The improvement set forth in claim 11 in which said spherically countoured element comprises truncation of its spherical contour around the terminus of said through-hole opposite said head, said free end of said shank projecting out of said through-hole beyond said truncation, and said resilient means comprising a helical coil spring acting on the distal portion of the free end of said shank.

13. The improvement set forth in claim 12 in which said distal portion of the free end of said shank comprises a spherical contour whose geometric center is substantially coincident with the geometric center of the spherical contour of said spherically contoured element.

14. The improvement set forth in claim 13 in which said mounting comprises spaced apart annular bearing surfaces for acting on opposite hemispherical portions of said spherically contoured element and cooperating in capturing said spherically contoured element on said mounting.

15. The improvement set forth in claim 14 in which said movable wall comprises a member which contains said mounting, said member containing said annular bearing surfaces, one of said annular bearing surfaces being on a lip of said member, and the limit of said conical zone of swivelling being defined by the abutment of said head with said lip, said distal portion of the free end of said shank subtending a conical angle at least as great as that of said conical zone so that said spring does not ride off the distal portion of the free end of said shank during swivelling of said elements on said mounting.

16. The improvement set forth in claim 11 in which said first-mentioned element has said shank press-fitted into said through-hole.

17. The improvement set forth in claim 11 in which said spherically contoured element comprises truncations of its spherical contour around the termini of said through-hole, said first-mentioned element having said shank press-fitted into said through-hole with said head abutting one truncation, and said free end of said shank projecting out of said through-hole beyond the other truncation, said shank having at its free end a spherically contoured distal surface which is conspherical with the spherically contoured surface of said spherically contoured element and on which said resilient means acts to resiliently urge said elements within said mounting in a direction toward said orifice, said means capturing said spherically contoured member on said mounting including an annular lip disposed for abutment by said head to define the limit of said conical zone of swivelling such that said resilient means is constrained from riding off said distal surface of said shank.

18. In a pressure regulator for a liquid fuel management system wherein a liquid fuel chamber portion of the pressure regulator is communicated to a source of liquid fuel for regulating the pressure thereof, said liquid fuel chamber is separated from a control chamber portion of the pressure regulator by a movable wall, said control chamber comprises means for controlling response of said movable wall to pressure conditions in said liquid fuel chamber such that a pressure regulating effect is imposed on the liquid fuel, said liquid fuel chamber comprises an orifice through which excess liquid fuel passes from said liquid fuel chamber, said orifice comprises a seat, and said movable wall carries a valve which coacts with said seat to open and close said orifice in performing the pressure regulating function, the improvement in said valve which comprises a stem comprising a head and a shank, said head being disposed for coaction with said seat to open and close said orifice, and said shank projecting away from said head and serving to operatively relate said stem to a separate spherically contoured element which is captured in a mounting carried by said movable wall and which swivels within said mounting about a center which lies substantially on an axis along which the valve moves toward and away from said orifice, a hole in said spherically contoured element which is open toward said orifice and whose axis lies on a radial to said center, and said stem being operatively related to said spherically contoured element by said shank having a press-fit in said hole.

19. The improvement set forth in claim 18 in which said mounting includes resilient means acting to resiliently bias said valve within said mounting in a direction toward said seat.

* * * * *